United States Patent
Patel et al.

(10) Patent No.: US 6,766,955 B2
(45) Date of Patent: Jul. 27, 2004

(54) OPTICAL CODE READER FOR PRODUCING VIDEO DISPLAYS

(75) Inventors: Mehul Patel, Fort Salonga, NY (US); Duanfeng He, Farmingville, NY (US); Eugene Joseph, Coram, NY (US); Mark Correa, Lake Grove, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 335 days.

(21) Appl. No.: 09/873,302

(22) Filed: Jun. 5, 2001

(65) Prior Publication Data

US 2001/0027995 A1 Oct. 11, 2001

Related U.S. Application Data

(62) Division of application No. 09/174,466, filed on Oct. 19, 1998, now Pat. No. 6,336,587.

(51) Int. Cl.$^7$ .............................................. G08K 7/10
(52) U.S. Cl. .............. 235/462.45; 235/454; 235/462.2; 235/462.08
(58) Field of Search ................................. 235/375, 380, 235/454, 467.01, 467.13, 467.08, 467.09, 467.2, 467.21, 467.3, 467.31, 467.45, 467.46, 467.48, 472.01, 472.02

(56) References Cited

U.S. PATENT DOCUMENTS

| | | | |
|---|---|---|---|
| 4,808,804 A | 2/1989 | Krichever et al. | |
| 5,210,398 A | 5/1993 | Metlitsky | |
| 5,365,049 A | 11/1994 | Peng | |
| 5,448,046 A | * 9/1995 | Swartz | ........................ 235/432 |
| 5,702,059 A | 12/1997 | Chu et al. | |
| 5,703,349 A | 12/1997 | Meyerson et al. | |
| 5,714,745 A | 2/1998 | Ju et al. | |
| 5,717,195 A | 2/1998 | Feng et al. | |
| 5,764,785 A | 6/1998 | Jones et al. | |
| 5,796,089 A | 8/1998 | Marom | |
| 5,814,803 A | 9/1998 | Olmstead et al. | |
| 5,920,060 A | 7/1999 | Marom | |
| 5,949,057 A | 9/1999 | Feng | |
| 5,973,318 A | * 10/1999 | Plesko | ................... 250/227.22 |
| 6,064,629 A | * 5/2000 | Stringer et al. | ............. 367/128 |
| 6,179,208 B1 | 1/2001 | Feng | |
| 6,336,587 B1 | * 1/2002 | He et al. | ................ 235/462.45 |

OTHER PUBLICATIONS

IMAGETEAM® 4400 Series, Handheld 2D Image Reader, ISL391 E, (Welch Allyn) (6/97).
Publication IR–2000 Features and Specifications, Met02–002, (Metanetics Corporation) (12/96).
Rudolf Kingslake, Optics in Photography, Depth of Field, 84–90, (Bellingham WA, SPIE) (1992).
André Maréchal, The Contrast of Optical Images and the Influence of Aberrations, 9–22, (NBS Circ. 526), no date.

* cited by examiner

Primary Examiner—Karl D. Frech
(74) Attorney, Agent, or Firm—Carter, Deluca, Farrell & Schmidt, LLP

(57) ABSTRACT

An imaging optical code reader is adapted for use in producing video displays and for use in motion detection surveillance using video compression and narrow band width communication links. An optical system including a plane parallel plate may be employed to change the system focal distance.

21 Claims, 13 Drawing Sheets

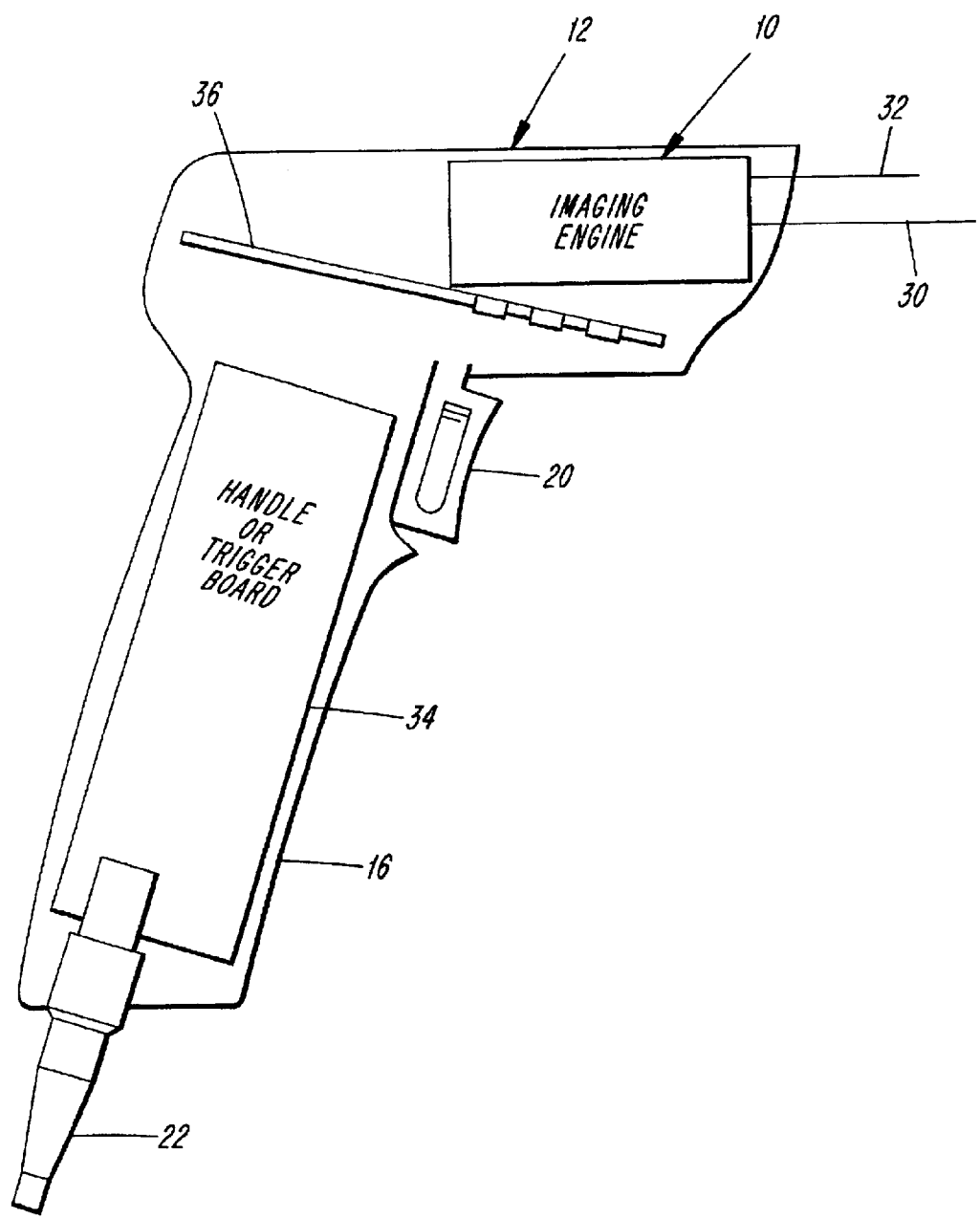

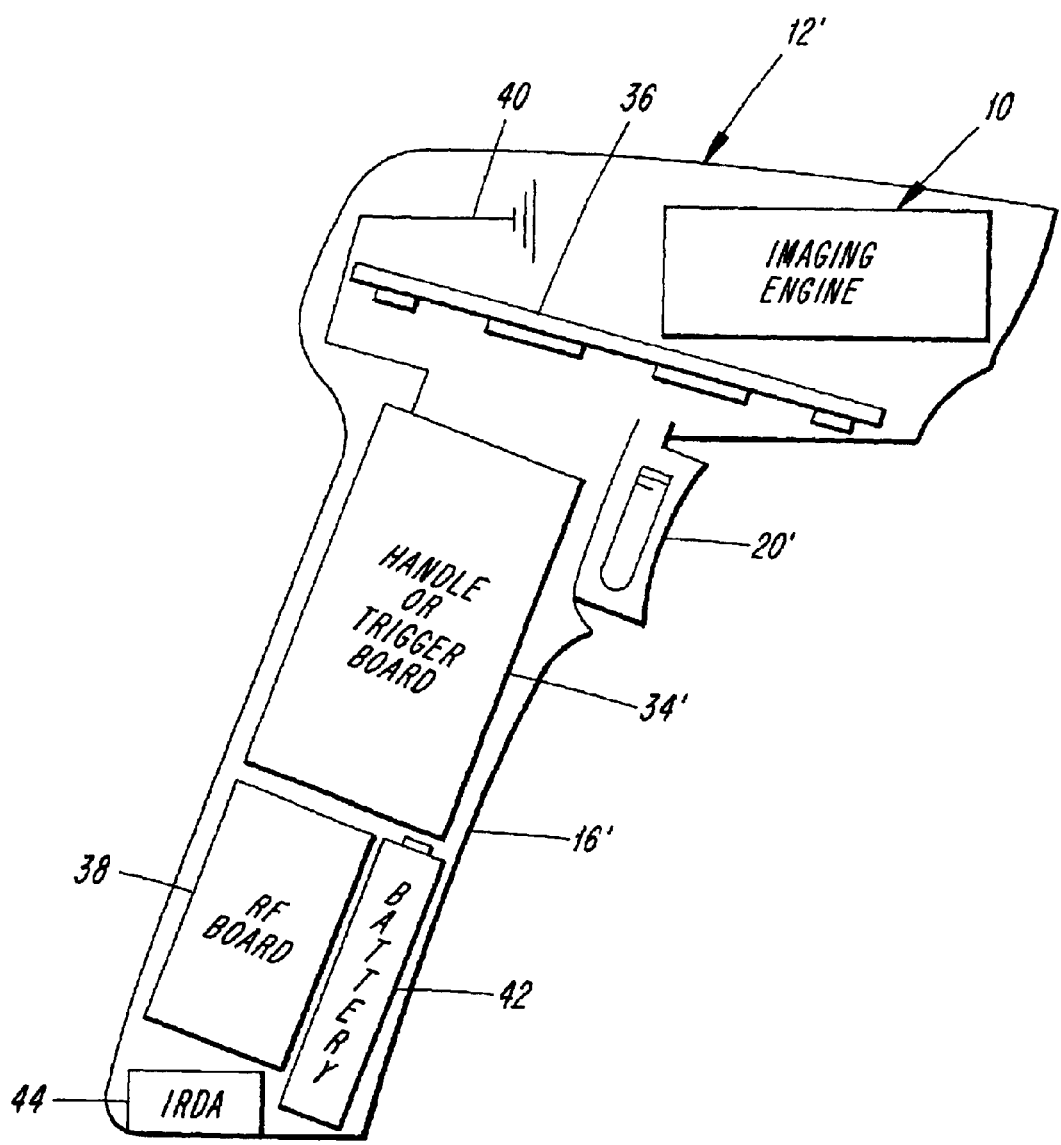

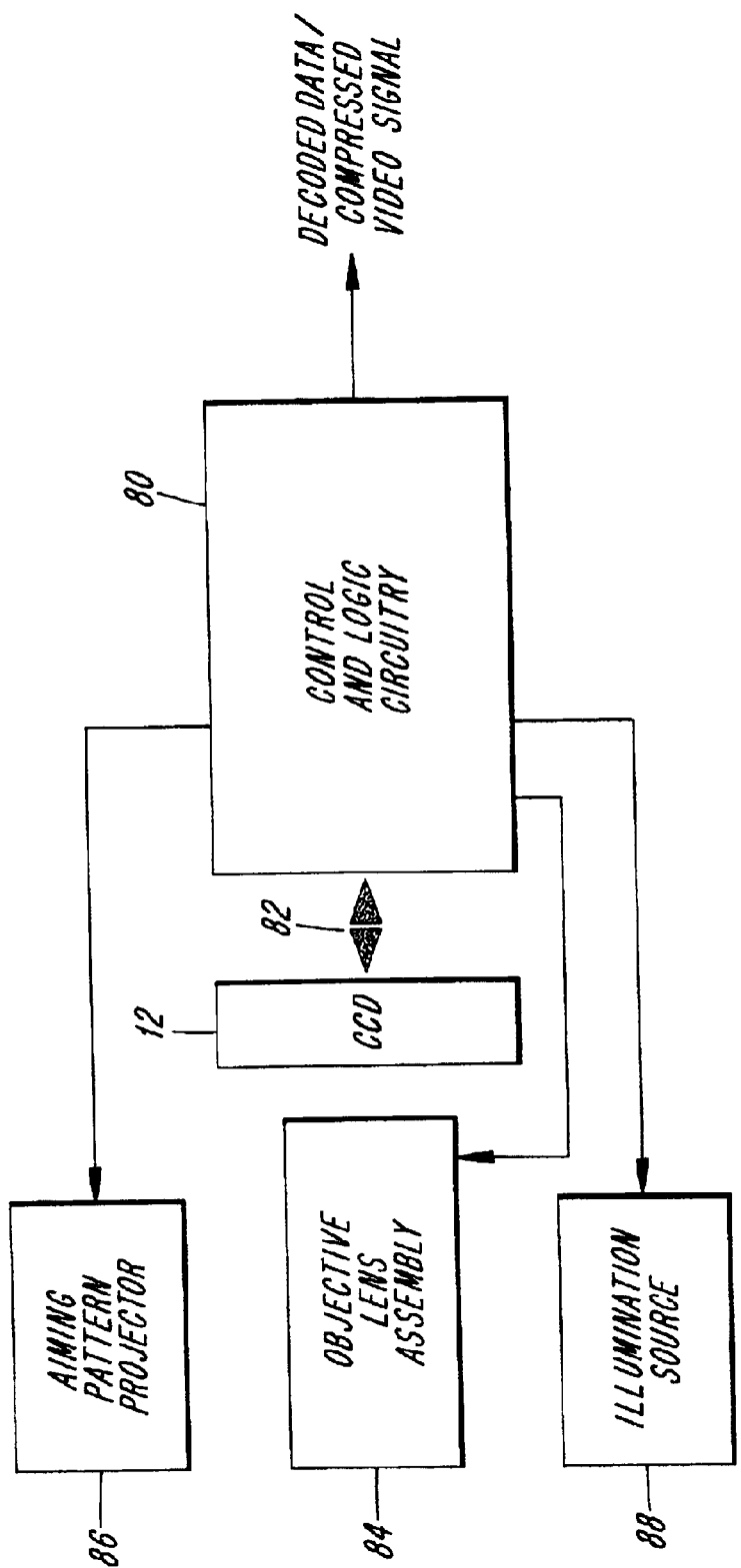

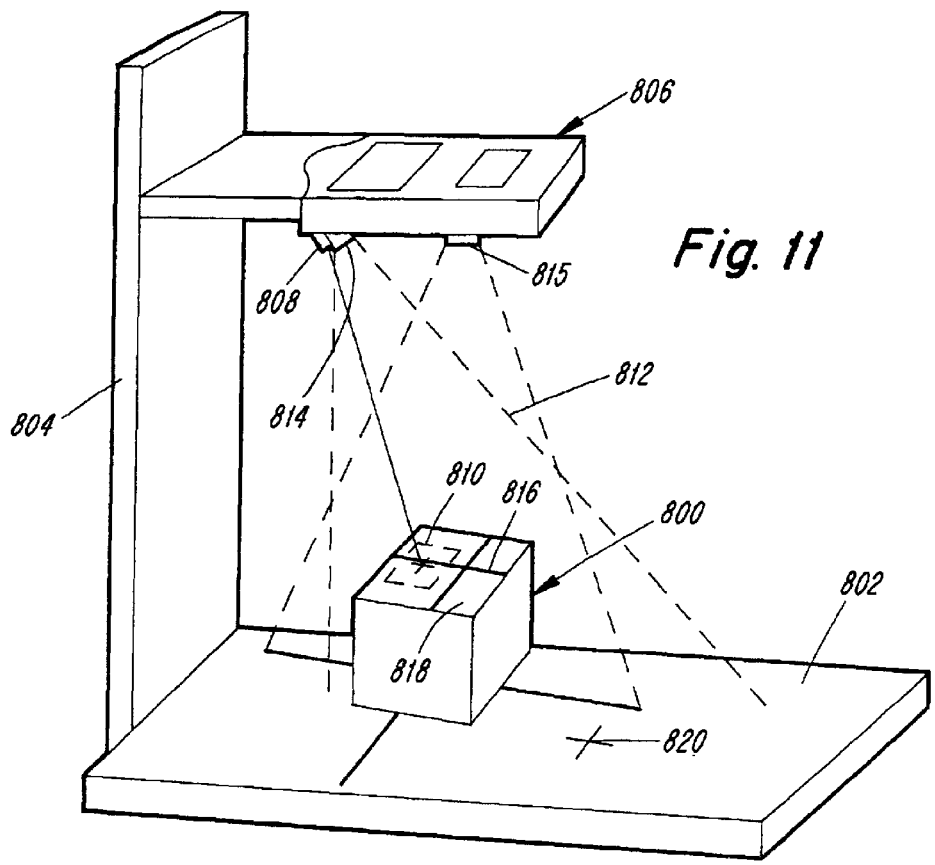
Fig. 11
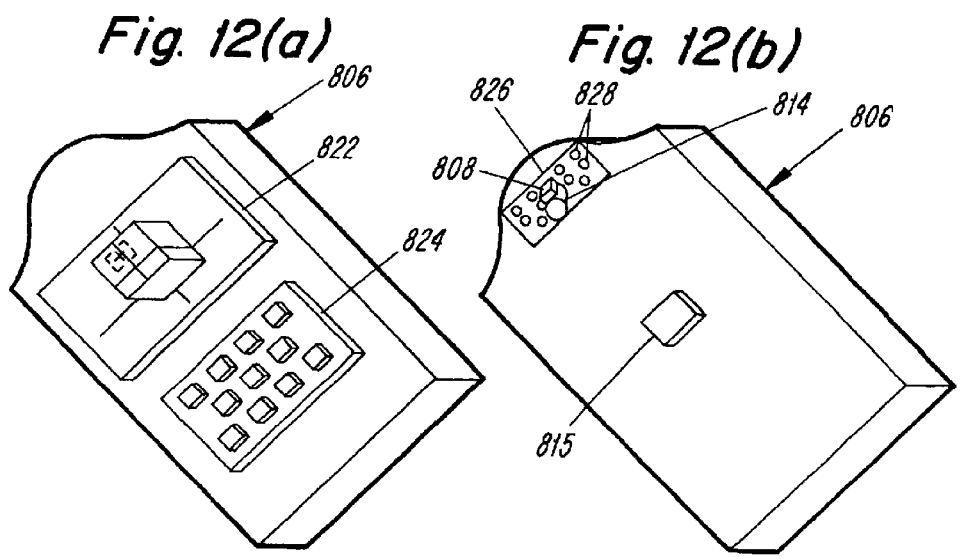
Fig. 12(a)    Fig. 12(b)

OPTICAL CODE READER FOR PRODUCING VIDEO DISPLAYS

This application is a divisional of application Ser. No. 09/174,466, filed on Oct. 19, 1998 now U.S. Pat. No. 6,336,587.

FIELD OF THE INVENTION

The invention relates to the use of optical code readers to produce video displays and to detect non-code image information. Aspects of the invention are particularly useful in handheld code readers with image sensors which are in communication with a host terminal.

BACKGROUND OF THE INVENTION AND OBJECTS

Most conventional optical scanning systems are designed specifically to read optical codes such as one-dimensional barcode symbols. Typical conventional scanning systems generate one or more beams of laser light which reflects off a barcode symbol and back to the scanning system. The system obtains a continuous analog waveform corresponding to the light reflected by the code along one or more scan lines of the system. The system then decodes the waveform to extract information from the barcode. A system of this general type is disclosed, for example, in U.S. Pat. No. 4,251,798, assigned to Symbol Technologies, Inc. A beam scanning system for detecting and decoding one and two dimensional barcodes is disclosed in U.S. Pat. No. 5,561,283, also assigned to Symbol Technologies, Inc.

Advantageously, barcodes and other optical codes can also be read employing imaging devices. For example an image sensor may be employed which has a two dimensional array of cells or photo sensors which correspond to image elements or pixels in a field of view of the device. Such an image sensor may be a two dimensional or area charge coupled device (CCD) and associated circuits for producing electronic signals corresponding to a two dimensional array of pixel information for a field of view. An "Imaging Engine And Method For Code Readers" is disclosed in a patent application so titled to Correa et al., assigned to Symbol Technologies, Inc. and filed on Jun. 12, 1998 which is hereby incorporated by reference. Many scanners in use today are deployed in handheld units which may be manually pointed at the target. Often an individual scanner is a component of a much larger system including other scanners, computers, cabling, data terminals and data displays. Applicants have discovered that imaging optical code readers, particularly when used in such systems, may be adapted to have new, non-code-reading functions.

Accordingly, it is a general object of the present invention to provide imaging systems which can be employed for code reading and for a variety of functions other than optical code reading.

Further, it is an object of the present invention to adapt imaging code readers for use in video displays, surveillance and detection of physical parameters of target objects.

Various lens systems have been developed for optical code readers. Applicants assignee, Symbol Technologies, Inc. has developed bi-stable high speed zone collection systems for barcode scanners. Systems which employ lens structures moveable into the input optical path of the scanner (drop-in optics) are disclosed in U.S. patent application Ser. Nos. 08/627,167 and 08/627,168 filed Apr. 3, 1996 to Li et al. A lens structure for an imaging code reader is disclosed in the above-mentioned Correa et al. patent application.

Conventionally, code reader lens systems are designed to provide a depth of field, focus and monochrome detection particularly adapted for code reading.

It is an object of the present invention to provide a simply and inexpensively fabricated objective lens system for an optical code imaging engine.

It is another object of the present invention to provide objective lens systems enabling an imaging optical code reader to be used effectively for both code reading functions and for non-coding reading functions such as color video displays and detection of physical parameters associated with a bar-coded object or its environment.

It is another object of the present invention to provide an imaging optical code reader with a field of view and working depth of view appropriate to the signal processing and decoding capabilities of the reader and with other optical fields and focal depths for other video functions.

In a number of businesses, in particular in transportation and food retail, it is desirable to decode a barcode and to determine the dimensions or size (Volume) and/or the weight of a package or item. Presently, multiple instruments and steps are required to obtain these parameters.

It is a further object of the present invention to use an imaging optical code reader system to determine such parameters.

Some or all of the objects previously described may be achieved in a single optical code reading engine or system. With the addition of appropriate control circuitry and data processing software, a system may be constructed serving the object of producing a compact, inexpensively fabricated imaging system for performing new video and image analysis functions.

These and other objects and features of the invention will be apparent from this written description and drawings.

SUMMARY OF THE INVENTION

The present invention relates to methods and apparatus useful in optical imagers, especially imaging optical code reader systems. Techniques are disclosed which are applicable to the design of imaging engines, imaging lens systems, aiming systems, code reading stations or terminals, and signal processing devices associated with imagers of various types.

An imaging and aiming apparatus for an optical code reader may be based on an image sensor, including an array of photo sensor cells for producing electronic signals corresponding to a two dimensional array of pixel information for a field of view. In preferred embodiments, the image sensor is a CCD. The image processing circuitry/software located in a handheld reader or terminal, may be employed to analyze a portion of a projected pattern. This information may be used as feedback to the processing circuitry to help identify an image area in which a target barcode is located. Such image processing may also be used for determining the distance between the reader and the target barcode or physical parameters associated with a target object or its environment.

A preferred embodiment of the present invention is a system for reading optical code for displaying video images, using essentially the same hardware.

A handheld optical code reader is provided including a two dimensional image sensor and means for compressing video data obtained from the sensor. The code reader is connected to a host terminal with a communication port and display monitor by a narrow band width data link over which compressed video data from the handheld optical code reader and decoded information from optical codes read by the handheld code reader is communicated to the serial communication port of the host terminal. In a more preferred embodiment, the system can be switched between a code reading function and a video display function. In the code reading mode, the system may be presented with a code containing the command for the system to switch to a video display function.

An example of the narrow band width data link between the handheld optical code reader and the remainder of the system may be an RS 232 cable connected between the handheld reader and a serial communication port of the host terminal. Such a link may operate, for example, at 115 k Baud to transmit a compressed 300×200 pixel image at 3–4 frames/second. Alternatively, the narrow band width data link may be a radio frequency transmitter and receiver or an infrared transmitter and receiver.

The system may further comprise circuitry/software for detecting motion in a field of view of the handheld optical code reader. In preferred embodiments, motion is detected by monitoring the bandwidth of the compressed video signal. In this way the handheld reader, can for example, be strategically positioned for security monitoring and be used to trigger an alarm or other indication of an intrusion into the field of view of the system.

Also disclosed is a related method for performing motion detection using an optical code reader. According to the method, an image sensor of the optical code reader is positioned so that a field of view of the image sensor includes a region to be monitored for motion. The optical code reader is switched from an optical code reading mode to a motion detection mode. Video data in the field of view of the image sensor is compressed by identifying changes between frames of video data, and the frequency of changes between frames of video data is monitored to identify relatively low frequency changes indicative of the movement of relatively large objects in the field of view. The method may include the further steps of transmitting the compressed video data from the optical code reader to a terminal, and displaying the image of the field of the range sensor at the terminal.

Physical parameters other than motion in the field of view of the optical code reader may be detected. The present invention includes systems for detecting optical code and, generally, one or more physical parameters of a target object. In a preferred embodiment, these systems include an image sensor for producing electronic signals corresponding to a two dimensional array of pixel information for a field of view containing the target object. A light pattern projector is provided to project a pattern such as a set of cross-hairs on objects in the field of view of the sensor. The system includes circuitry/software for reading an optical code in the field of view of the image sensor as well as for determining a physical parameter of the target object from the reflection of the light pattern from the target object onto the image sensor.

In more preferred embodiments the physical parameter of the target object is determined by measuring edge discontinuities in the light pattern caused by that target object. The system may further comprise a platform for supporting the target object in the field of view of the image sensor. An arrangement of springs or other weight sensitive structures may be provided to support the platform and permit the platform to move through a distance approximately proportional to the weight of the supported target object. A counter surface adjacent to the platform may be used to produce an edge discontinuity in the reflected pattern between an edge of the platform and an adjacent edge of the counter surface. In the case that the projected pattern is a line, a separation distance between reflected segments of the line at an edge discontinuity may be measured and used as an indication of weight based on a predetermined correlation between the two values.

In another preferred embodiment the projected pattern includes at least one line and a vertical height of an object on the platform is detected by measuring a discontinuity in the line at an upper edge of the object. In a further embodiment, the projected pattern includes two non-parallel lines. A length and width of the object on the platform is detected by measuring the length of a segment of one line lying between edge discontinuities in the direction of the length of the object, and the length of a segment of the other line lying between edge discontinuities in the direction of the width of the object, respectively.

Thus, the system may be capable of reading a code on a target object, producing a video display detecting motion in a field of view of the system, determining the distance to the target object, determining its weight, and determining its height, length and width.

This summary is provided for the convenience of the reader, it being understood that the particular subject matter which applicants regard as their invention is defined in the claims.

BRIEF DESCRIPTION OF THE DRAWINGS

FIGS. 2 and 2a are a sectional views of preferred embodiments of a handheld imaging optical code reader showing the imaging engine and internal component placement;

FIG. 3 is a simplified functional block diagram of a preferred embodiment of an imaging engine which may be used in preferred embodiments of the present invention;

FIG. 11 shows an apparatus in pictorial view for measuring the dimensions of an object and its distance;

FIGS. 12(a) and (b) are, respectively, top and bottom views of a projecting and imaging component of the apparatus of FIG. 11.

DETAILED DESCRIPTION OF THE DRAWINGS

Systems Overview

Figure 1:
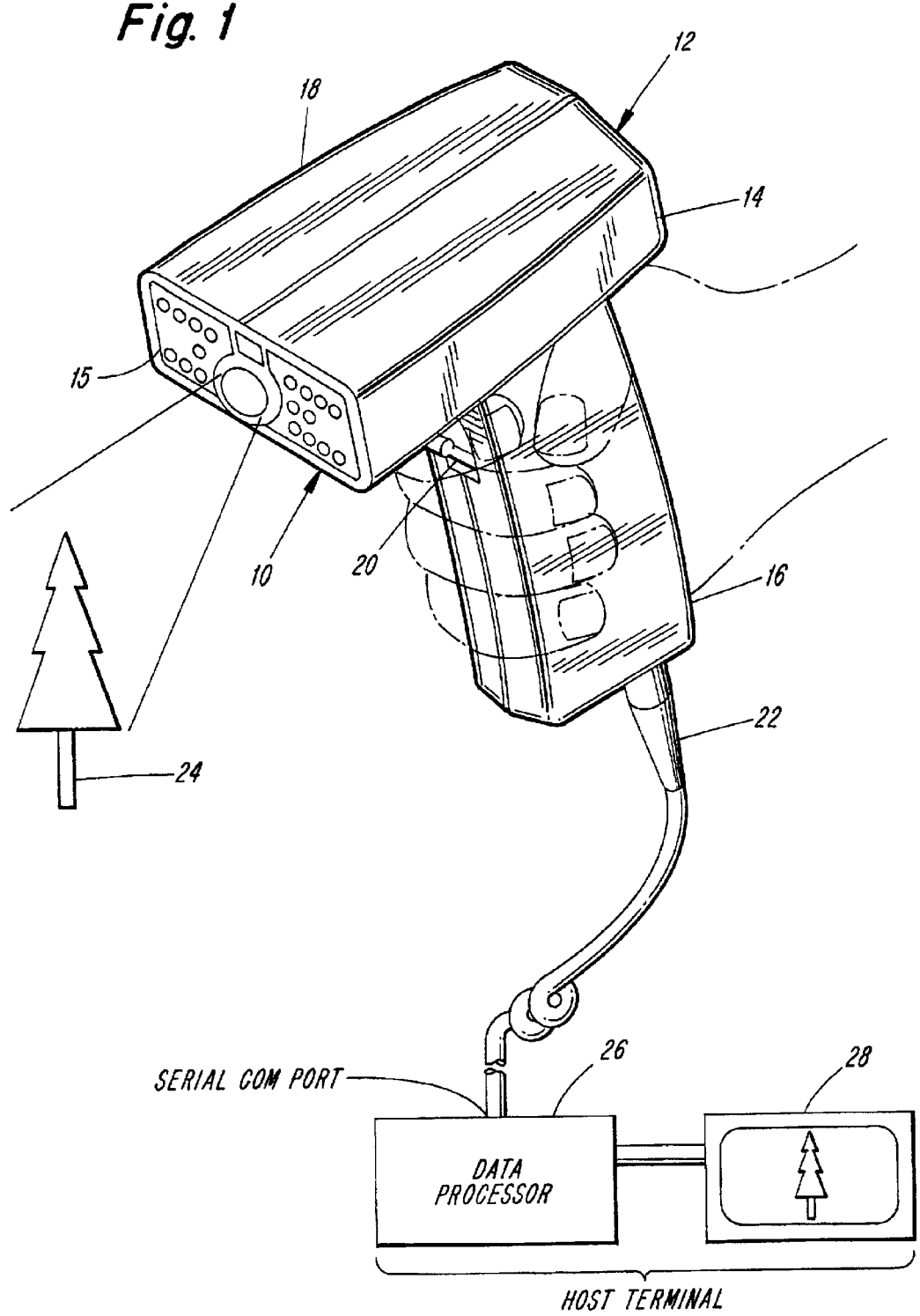
FIG. 1 is a pictorial view of a handheld optical code reader and host terminal.

FIG. 1 is a pictorial view of a handheld optical code reader and a schematic view of a host terminal which may be used for various of the imaging functions of the present invention. Advantageously, the optical code reader employs an imaging engine 10 of a type described in U.S. patent application to Correa et al. filed on Jun. 12, 1998 and entitled "IMAGING ENGINE AND METHOD FOR CODE READERS", Ser. No. 09/096,578, which application is hereby incorporated by reference.

As shown in FIG. 1, the handheld code reader 12 includes a housing 14 having a generally elongated handle or hand grip 16 and an upper portion 18 for housing the imaging engine 10. The front face 15 of the imaging engine appears at the forward end of the upper portion of the handheld optical code reader 12. The cross sectional dimensions and overall size of the handle portion 16 are such that the optical code reader can conveniently be held in the user's hand.

A manually actuatable trigger 20 is mounted in moving relationship on the handle portion 16 in a forward facing region of the optical code reader. The user's forefinger is normally used to actuate the optical code reader by depressing the trigger. A flexible electrical cable 22 may be provided to connect the optical code reader to a host terminal. In alternative embodiments the cable may also provide electrical power to the scanning engine 10. In preferred embodiments the cable 22 is connected to a host terminal or system which receives decoded data from the optical code reader. In alternative embodiments a decode module may be provided exterior to the optical code reading engine 10 in the host terminal or system.

The apparatus of FIG. 1 may be used to obtain non-code image data. An object 24 in the field of view of the code reader may be sensed. Compressed image data may be transmitted to the host terminal over electrical cable 22. The transmission of video data may be triggered by pressing the trigger 20 or by actuating another switch on the handheld code reader. The image data may then be applied to the host terminal. The compressed image data may be applied to a serial communication port of the host terminal such as the serial communication port of a personal computer when such a device is used as the host terminal. The image data may be processed by a data processor 26 within the computer and selectively displayed on monitor 28. A color video image may be obtained in the manner described below.

FIG. 2 is a sectional view of a preferred embodiment of a handheld optical code reader in accordance with preferred embodiments of the present invention showing the location of the imaging engine 10. Advantageously, the imaging engine 10 includes a laser aiming pattern generator. The parallel, offset relationship between a principal axis 30 of the objective lens assembly and the principal axis 32 of the aiming system is also shown.

A trigger or handle circuit board 34 is located in the handle portion 16 of the handheld optical code reader 12. The trigger board is electrically connected to switch means associated with the trigger 20 of the handheld device and processes signals indicative of the operator's depressing of the trigger 20 in order to initiate, or continue reading of optical codes or initiate transmission of a video image.

In an alternative embodiment a decoding board 36 (including the microprocessor) may be provided external to the imaging engine 10. In circumstances where the handheld optical code reader of FIG. 2 is to be retrofitted from a laser line scan engine to an optical imaging engine, the imaging engine 10 and decoding board 36 may be inserted in place of the line scan engine and circuit board in the handheld code reader. In this way previously designed toolings, housings and host devices may be employed and provide continuity in upgrading the code reading system.

Compression of the video signal provided by the imaging engine may be performed by data compression software executed by a microprocessor located in the imaging engine 10 or, optionally in the decoding board 36 or handle board 34. On command, the compressed video data may be transmitted to the host terminal via cable 22.

FIG. 2a is a sectional view of another preferred embodiment of a handheld optical code reader 12' in accordance with preferred embodiments of the present invention showing the location of the imaging engine 10. This embodiment is battery powered and wireless. A decoding board 36 (including the microprocessor) may be provided external to the imaging engine 10.

A trigger or handle circuit board 34' is located in the handle portion 16' of the handheld optical code reader. The trigger board is electrically connected to switch means associated with the trigger 20' of the handheld device and processes signals indicative of the operator's depressing of the trigger 20'.

In addition to circuitry associated with the trigger, the handle of the optical code reader of FIG. 2a may contain a radio frequency board 38 and antenna 40 which provide a mobile radio link to one or more data terminals. Electrical power for the optical code reader 12' may be provided by battery 42. An infrared data interface (IRDA) 44 or multi-contact shoe (not shown) may also be provided to communicate data between the optical code reader and an external receiver or docking device, respectively. Compressed image data may be transmitted to the host terminal via a radio frequency link, IR communication link, or direct contact with the docking device.

It will be understood that aspects of the present invention are also applicable to imaging engines which are not located in conventional handheld scanners or guns. For example, the imaging engine may be incorporated into a computer terminal in a fixed location or in a rotating turret. Such arrangements are particularly well adapted for using the imaging engine as part of a video phone system which also uses the display, processing and I/O capabilities of the computer.

Alternatively, the imaging engine may be attached to a portable computer device such as a PALM PILOT, or attached to portable scanning systems or terminals such as those available from applicant, Symbol Technologies, Inc. Such systems may be incorporated as part of a local area, cellular or wide area network to coordinate scanning and other image processing functions described below.

Figure 2B:
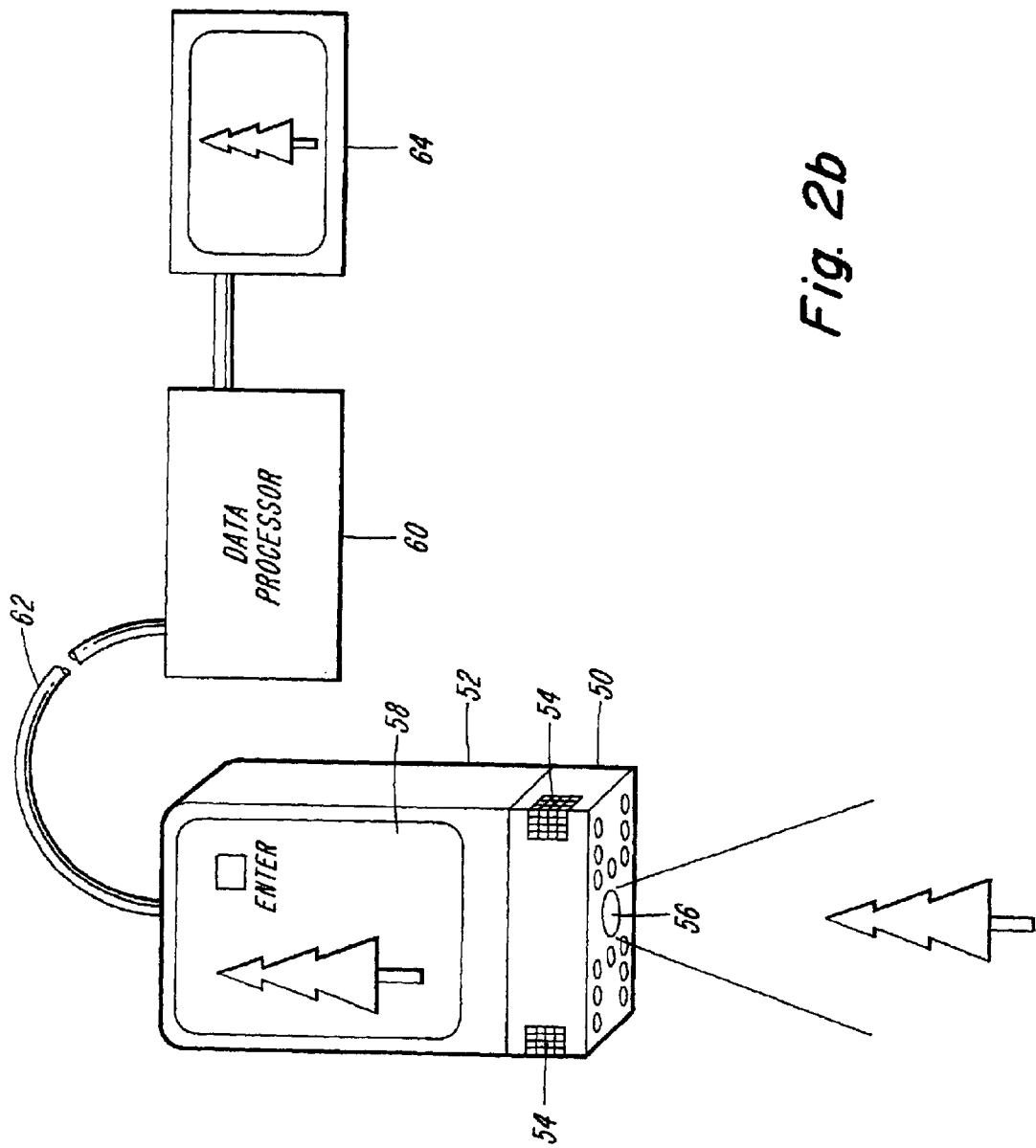
FIG. 2b is a pictorial view of a handheld computing device equipped with an optical code reader and host terminal.

An example of such a system is shown in FIG. 2b. An optical code reader 50 is shown attached to an end of a handheld computing device 52. Code reading or image capture may be initiating by depressing triggers 54. Image information is obtained through the objective lens assembly 56, which may be displayed on a screen 58 of the handheld computing device. Optionally the computing device may be connected to a host terminal data processor 60 by a wire link 62 as shown or by an IR or RF communication link. Video information obtained by the system may be displayed at a host terminal monitor 64.

In portable applications where electrical power is supplied by batteries, it is particularly important to conserve energy. Power management techniques for such portable images may include the provision to switch the images to lower resolution or frame rates to conserve power. Alternatively, the imager may be periodically shut down, or shut down when the system senses that the battery charge level has dropped below a preselected level.

Imaging Engine

Imaging engine electronic hardware includes two major electrical subsystems: an imaging subsystem and a decoding subsystem. The imaging subsystem includes an area solid-state image sensor, analog-to-digital converter, timing generator, automatic gain control (AGC) circuit and the peripheral circuits to control the above components. The decoding subsystem is constructed around a micro processor unit. In preferred embodiments the micro processor is an EBM manufactured Powered PC (403 Series). The PowerPC is a 32 bit RISC embedded controller which provides high performance and functional integration with low power consumption. Other components of the decoding subsystem include a flash ROM, DRAM, I/O (8 bit bidirectional parallel port, 16 user/system single bit I/O's) and required glue logic.

FIG. 3 is a functional block diagram of a preferred embodiment of the imaging engine of the present invention illustrating the arrangement of certain electrical components of the imaging engine. The electronic hardware comprising the imaging subsystem and decoding subsystem is represented generally by a block 80, labeled "control and logic circuit" in FIG. 3. A double headed arrow 82 illustrates the conductance or transmission of signals between the image sensor 12 and the control and logic circuit 80. As shown in FIG. 3, the objective lens assembly 84, the aiming pattern generator 86 and the illumination source 88 may be controlled by signals provided by the control and logic circuitry 80. These interrelationships are described in greater detail in the above-mentioned patent application entitled "IMAGING ENGINE AND METHOD FOR CODE READERS".

Figure 4:
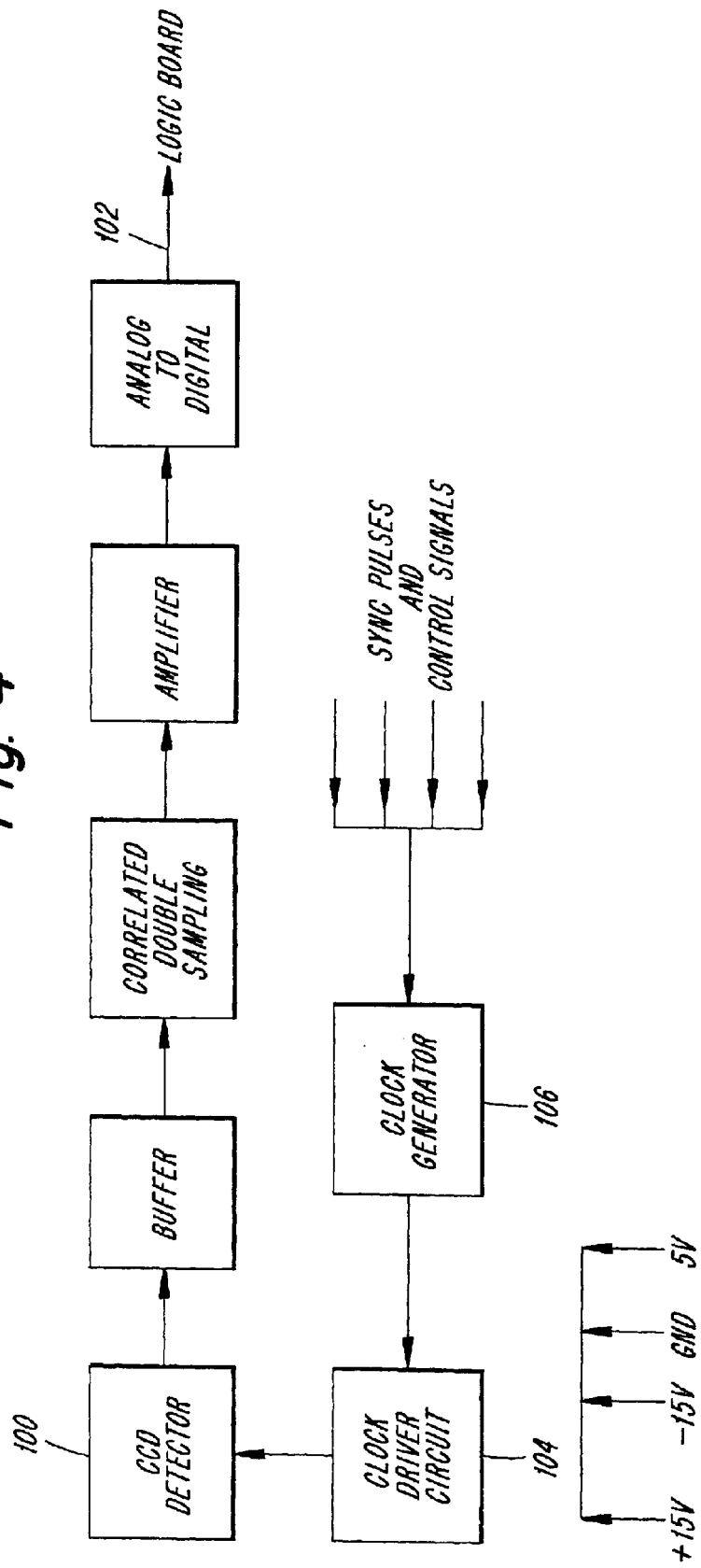
FIG. 4 is a block diagram of an image sensor circuit board which may be used in a preferred embodiment of the present invention.
Figure 5:
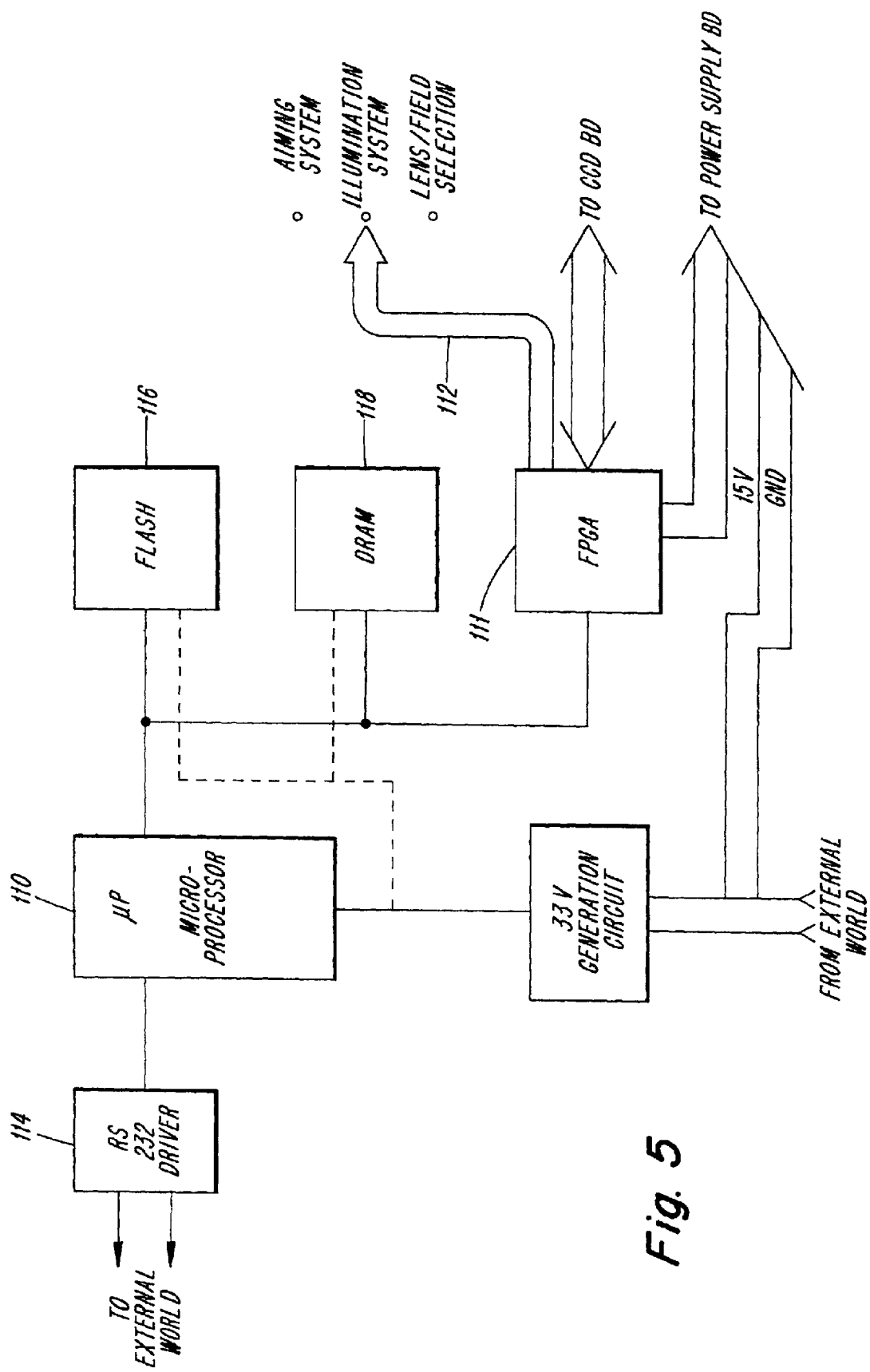
FIG. 5 is a block diagram of a logic circuit board which may be used in a preferred embodiment of the present invention.

FIGS. 4 and 5 are block diagrams of various electronic circuits and circuit boards employed in preferred embodiments of the present invention. FIG. 4 is a block diagram of a CCD circuit board. As shown in FIG. 4, electronic signals from a CCD detector 100 pass through various signal conditioning blocks to produce a digital output signal 102 applied to a logic board or circuit of the system. The CCD detector is provided with power supply board or system (not shown) and clock driver signals by the clock driver circuit 104. Various sync pulses and control signals are applied to a clock generator 106 from an FPGA on the logic board (FIG. 5).

FIG. 5 is a block diagram of a logic circuit board employed in a preferred embodiment of the present invention. The heart of the logic board is a microprocessor 110. Digital signals from the imaging sensor circuits are supplied to the microprocessor by FPGA circuit 111. As indicated by the data line 112, the FPGA circuit 111 provides control signals from the microprocessor for the aiming system, illumination system and objective lens servo system. The microprocessor also provides information to systems external to the imaging engine via the RS 232 driver 114.

Conventional video data compression software may be stored in the DRAM 118 and be executed by the microprocessor 110. Compressed video images may be transmitted to the external world, especially to the serial port of the host PC or terminal to permit display or recording of the image incident on the imaging sensor.

The microprocessor may also communicate by data line to Flash memory 116 and DRAM memory 118 on which other data and software for the system are stored. This information may include decoded data from a target optical code.

Video Display/Recording

Figure 6:
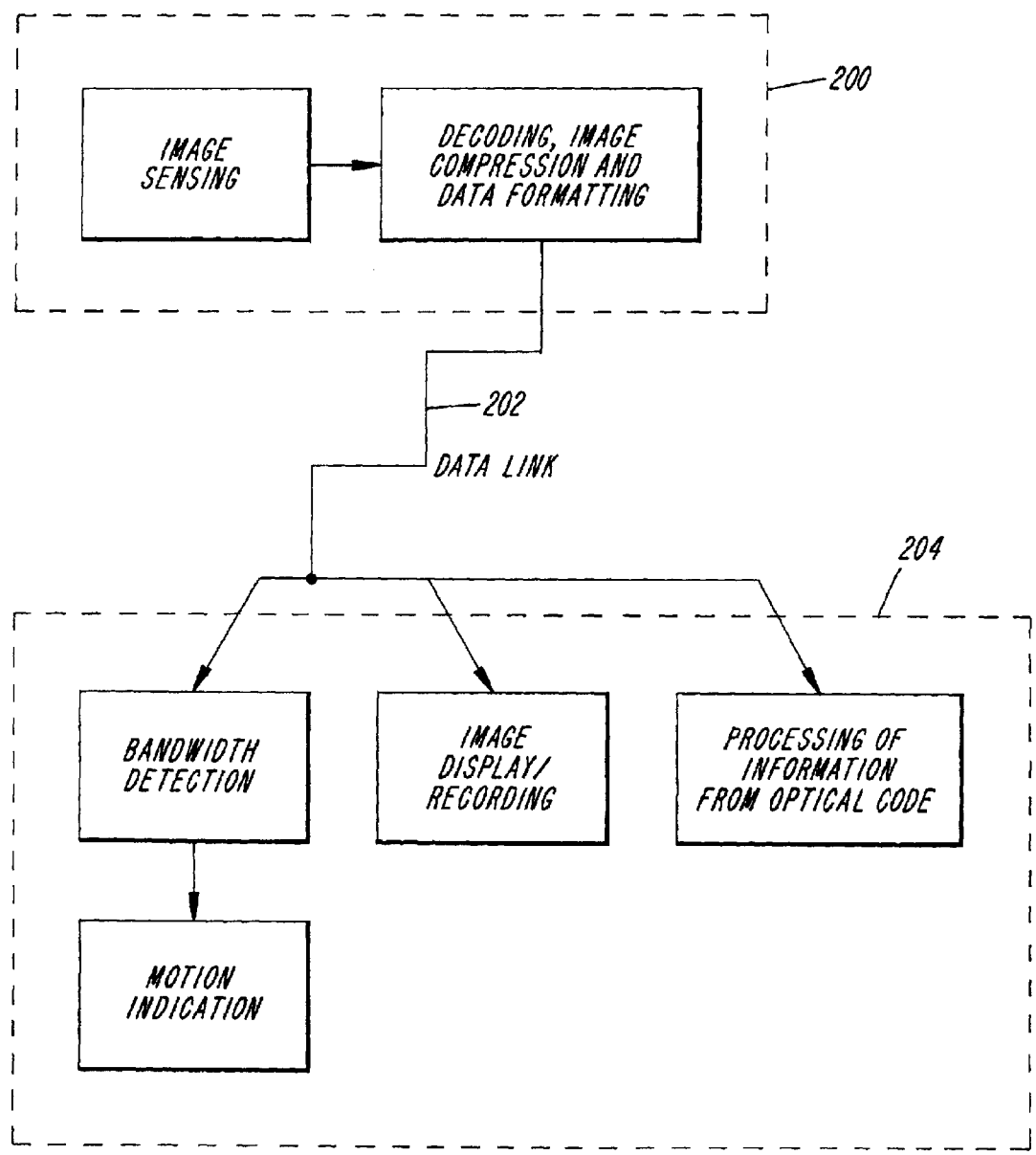
FIG. 6 is a schematic diagram illustrating the processing of image sensor data in a preferred embodiment of the present invention.

FIG. 6 is a schematic diagram illustrating the processing of image sensor data in preferred embodiments of the present invention.

Information from decoding of an optical code and/or compressed video information obtained by a handheld code reader 200 may be transmitted over a data link 202 to a host terminal 204. In the host terminal or handheld unit, the bandwidth of the image signal may be used for motion detection as discussed in detail below. Further, information concerning physical parameters of an object in the field of view of the image sensor, may be measured. Additionally or alternatively, individual video frames may be processed and displayed on the terminal monitor.

The present invention employs conventional real time video compression techniques such as have been used in Internet telephony. However, in the present invention, a handheld code reader is used to provide an approximation of real time or full-motion video output through the standard scanner interface. Such output may be at least 3 frames per second, and preferably 20–30 frames per second or more. This provides a means to view the intended imaging target on the host system prior to the time that decoding is initiated (for example by pulling the trigger on the handheld code reader). This technique can also be used to speed image transmission to other components (e.g., host processor or display subsystems) within an embedded imaging terminal. The compressed video from the scanner will be transmitted over an interface (e.g., serial COM port) which is standard on most computer systems. Thus, the system does not require special host system hardware (e.g., frame grabbers) to capture a video signal for digital use. Use of this compression scheme also enables other implementations.

Thus, the code reader can be used in a fashion similar to a camcorder. The system can double as a code reader and a video camera, video display or video recorder, such as those used in surveillance applications. The addition of a wireless radio link provides a portable video recording unit.

The video display/recording functions can be controlled by data input from control function barcodes. For example, a barcode may encode the command to display the video image obtained by the code reader. When this code is scanned, the system is converted into a video display mode. Such command codes may be used for other functions, for example, to turn off the laser aiming pattern of the code reader, in order to avoid projecting the pattern on the video image target and cluttering of the resultant display.

Motion Detection and Tracking

Video compression is a technique useable to accommodate limited bandwidth data links. One conventional approach to compression is to transmit only differences between adjacent frames. When this approach is used, a stationary scene requires zero bandwidth. Changes in the utilized bandwidth therefore indicate that motion has occurred. An inexpensive, automated motion detector can be implemented by monitoring the bandwidth requirement of the compressed video signal. As an alternative implementation, the frequency of the changes in the bandwidth of the compressed video signal can be monitored to deduce the magnitude of the change in the image scenery. Scenes with small amounts of motion, such as when imaged leaves are moving in the wind, produce mostly high-frequency (or localized) changes. However, motion of an object which consumes a relatively large image area, (such as a car) causes low frequency (or global) changes as well as high frequency changes. The image compression algorithms used in video transmission send low frequency changes first if they are present. By detecting whether low-frequency information is received, the host computer can easily detect motion and also perform a determination of the magnitude of the motion.

The system of the present invention is also capable of capturing multiple frames at regular intervals. Similar objects can be identified in adjacent frames resulting in a motion tracking algorithm. An object's speed can be estimated by measuring the position and time differences of the object between multiple image frames.

Selectable Optics

Imaging readers, designed to read optical codes for the largest possible working range, generally do not image scenes clearly. This is because their focal distance is usually relatively short. To image scenes clearly, an imager (such as a fixed focus camera) should be focused at the hyper-focal position, where objects farther than a certain distance from the imager are all imaged with clarity.

Imaging scanners generally can only take black-and-white images. Intrinsically colored detector arrays (such as CCDs) do exist, but it is very difficult to convert the intrinsically colored pictures they take into black-and-white images for decoding barcodes. This is because it is difficult to accurately calibrate the ever-changing illumination conditions and the reflective characteristics of the background material for the barcode. Without accurate black-and-white images, it is difficult for an imaging scanner to achieve its full potential in decoding barcodes. Its main performance measures, such as the working range, will suffer.

Figure 7:
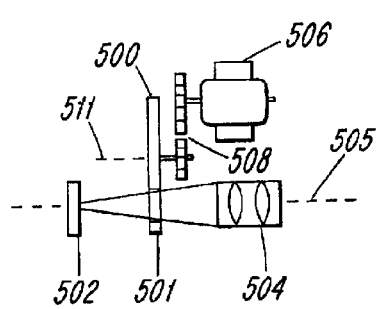
FIGS. 7 and 7a are schematic diagrams illustrating a wheel with selectively positionable optical sectors used in preferred embodiments of the present invention.
Figure 7A:
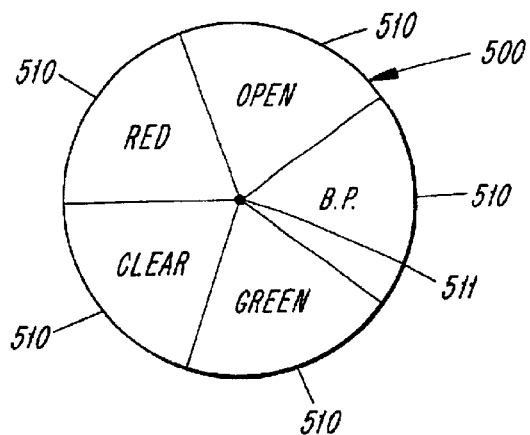

In response to these problems, preferred embodiments of the present invention may employ selectable optical systems such as those illustrated in FIGS. 7 and 7a. The illustrated system employs a pivotable or rotatable carrier or wheel 500 with selectively positionable optical sectors.

The electro-optical components of the code reader may include an image sensor chip 502 (such as a CCD, CMOS detector, CMD or CID) and an objective lens 504, located on a principal optical axis 505 (input optical path) of the system. The particulars of this part of the system are discussed in detail in the above-referenced application entitled "IMAGING ENGINE AND METHOD FOR CODE READERS".

A portion 501 of the wheel 500 is shown located in the input optical path of the sensor chip 502 as shown in FIG. 7. In FIG. 7 the optical path is shown as a straight path passing through a simple objective lens and a single sector of wheel 500. It will be understood, however, that the teachings of the present invention may be applied to systems with folded input optical paths or multiple objective lens elements. A stepper motor 506 may be coupled to the wheel 500 by gearing 508 to selectively rotate the wheel 500 to position a sequence of different wheel sections on the input optical paths.

As shown in FIG. 7a, the wheel 500 may have multiple angular sectors 510 extending radially outward of the wheel axis 511, the sectors affect the incoming light in various ways. In the wheel embodiment of FIG. 7a, five sectors are provided: transparent (clear), green filter, red filter, band pass filter, and open sector.

The open sector may be used for code reading, in order to employ a focal distance selected for typical target code distances. A transparent (clear) glass sector may be placed in the optical path of the system to produce a higher focal distance, more appropriate for video imaging. For color video, most of the video information may be obtained through the transparent glass sector as well. However, the image may also be sampled through the red and green filters to obtain chroma information for rendering a color display. The band pass sector may employ a filter whose optical pass band is selected to transmit light at the wavelength of the laser aiming system or pattern projecting system. This enhances the detection of the pattern, particularly in high ambient light environments (e.g. sunlight) where the pattern might not otherwise be detected.

The use of the wheel 500 avoids the need for elaborate mechanical means for optically aligning various filters, such as drop-in filters. A distinctive filter such as the band pass filter may be used to synchronize rotation of the wheel 500. In other words, detection of light signals predominating in the pass band can be used as a synchronizing signal to indicate that the band pass filter is currently rotated into the optical path of the sensor.

The use of the clear glass and open sectors described above is an example of a bifocal optical system, employing focusing through a parallel plate to selectively change nominal focusing distance of the system. The theory of operation of such a system will now be explained in greater detail.

Figure 7B:
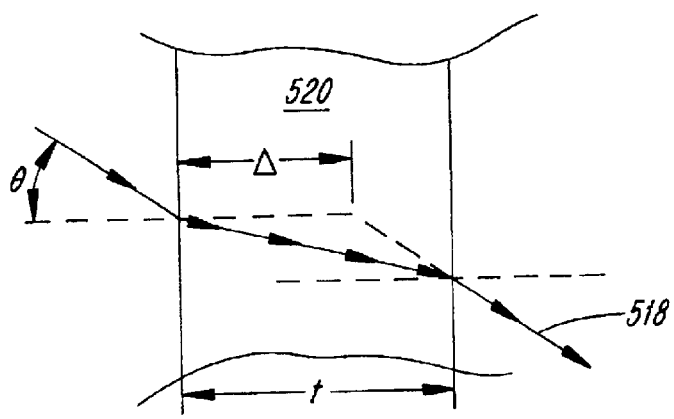
FIGS. 7b–7d are diagrams illustrating optical properties of a bifocal system using a selectively inserted plane parallel plate.

As illustrated in FIG. 7b, when a light ray 518 passes through a plane parallel plate 520 of thickness t, the ray appears to be shifted by a distance A perpendicular to the plate. This effect makes an object behind a refractive media (such as a glass plate or a layer of water) appear closer to the observer. The shift is approximately constant when the angle θ is small:

$$\Delta \approx \left[1 - \frac{1}{n}\right] t \tag{1}$$

where n is the refractive index of the plate. The perpendicular shift A may be used to selectively modify the focal distance of an imaging system to change the system from a code reading mode to a video or scene imaging mode as described as follows.

Figure 7C:
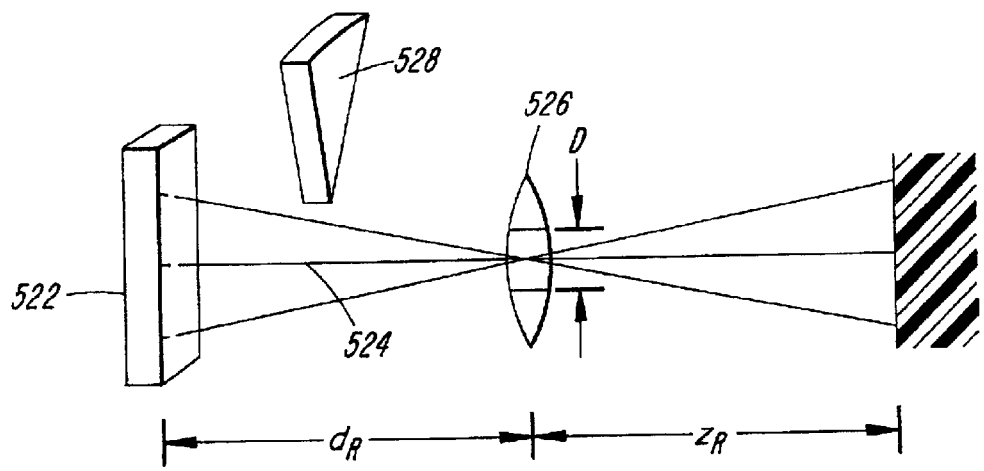

The nominal focal distance $Z_R$ for a code reader is determined by various optical considerations and assumptions concerning code symbol size, working distances, available optics, etc. A typical nominal focus distance $Z_R$ for a code symbol is 5 inches. The relationship of $Z_R$ to the geometry of the code reader is illustrated in FIG. 7(c). In the Figure, the area image sensor 522 (e.g. the CCD) is located on the optical axis 524 of the objective lens or lens assembly 526, spaced at a distance $d_R$. The value $d_R$ may be calculated in accordance with the following equation $$d_R = \frac{1}{\frac{1}{f} - \frac{1}{Z_R}} \tag{2}$$

where f is the focal length of the objective lens. For example, for a lens with an f=8 mm, the nominal range distance $d_R$ for reading code 5 inches from the imager is 8.538 mm.

However, when imaging is done for human visual consumption, different focal properties are desired. In such a case, a determination must be made of a Z value appropriate for the system and its uses with a desirable working focal depth and tolerable focal aberration.

In a hyper-focal mode, normally a greater Z value is desired (a nominal video imaging focal distance called $Z_1$).

In accordance with the teachings of this invention, in the hyperfocal mode, an effective distance $d_V$ between the imager sensor (e.g. CCD chip) and the objective lens assembly of the system is selected such that the largest depth of focus is achieved from a selected finite distance all the way to infinity. This distance $d_V$ represents the effective distance between the image sensor to the objective lens assembly when a plane parallel plate or plate sector 528 is moved into the optical path of the system between the image sensor 522 and the objective lens assembly 526.

The hyper-focal configuration may be calculated by setting the defocus abberation of an object at infinity to be the maximum tolerable error for video focusing. There are various conventional ways to estimate the maximum tolerable abberation. One is to set the geometrical spot size to be that of the system pixel size (or pixel pitch). Another conventional method is to chose a maximum wavefront error of $\lambda/4$. Using the latter method (which is a looser criterion giving a larger depth-of-focus), the defocus wavefront error of a object at infinity is given by δ, if z is the distance to the front focal point:

$$\delta = z(1-\cos\theta) = \lambda/4,$$

where θ is given by $$\sin\theta = D/2z.$$

where D is the aperture diameter of the system. When θ is small (valid for large F number systems such as the imaging system of imager code readers), the following relationship is valid:

$$\cos\theta = \sqrt{1-\sin^2\theta} \approx 1 - \frac{1}{2}\sin^2\theta.$$

Solving for ZV yield the expression:

$$Z_v \approx D^2/2\lambda \qquad (3)$$

Figure 7D:
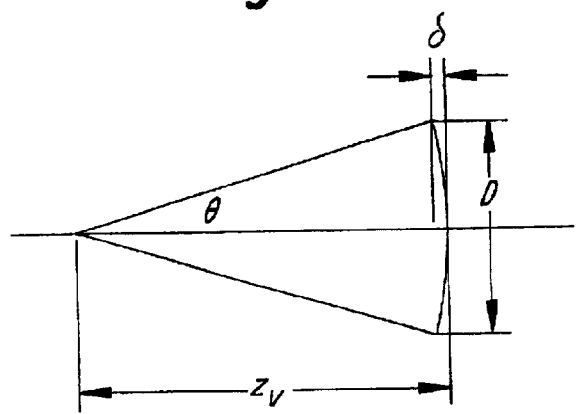

The underlying geometry of this calculation is illustrated in FIG. 7(d). It will be understood that the distance $Z_v$ lies between a Z value of infinity and a near location It will also be understood that the system has a defocus wavefront error of about ¼ at infinity and at the near location $Z_R/2$.

Assuming a small lens assembly aperture used in the disclosed imaging engine of 0.8 mm, and a mid-band wavelength of $600 \times 10^{-9}$ m, the value $Z_R$ (hyper-focus position) is calculated to be about 21 inches, in accordance with equation (3). From this, the corresponding image distance $d_v$ is calculated to be about 8.122 mm using an equation of the form of equation (2). Thus $d_v$ is approximately 0.416 mm shorter than the value previously calculated for $d_R$. A parallel-plate of thickness t may be inserted in the optical path to shorten the distance $d_R$ of the system to an effective distance $d_v$. Solving equation (1) for t yields the equation:

$$t = \frac{\Delta}{n-1} \cdot n = \frac{d_R - d_v}{n-1} \cdot n$$

where n is the refractive index of the plate. Assuming n to be 1.6 and using the example values of $d_R$ and $d_V$ previously calculated, yields a t value of 1.109 mm. A piece of glass with such a thickness is not difficult to move in-and-out of the optical path of the disclosed imaging code readers. The depth-of-focus for the hyper-focal system is from 10.5 ($Z_R/2$) inches to infinity. It will be understood that the aforementioned approach may be used to produce an imaging code reader with various selectable focal distances $Z_R$ for each code reading as opposed to video imaging of scenes. In this way a more versatile code reader may be provided.

An imager system with a selectively inserted refractive plate is relatively easy to manufacture. The positioning of an inserted plate (for instance a glass plate) does not have to be accurate, as the longitudinal ray shift does not depend on the position of the plate. The only requirement is that the plate intercept all of the rays needed at the detector. A slight rotation of the plate has only minimal effect. Assuming a rotation angle of α, one can easily verify that the back focal point shifts longitudinally in proportion to cos(α), and transversely in proportion to sin(α). The cosine function is not very sensitive to rotation, while a transverse shift is not important in most applications, as long as the detector is large enough (which is true for CCD imager scanners in general).

The system described above can be further enhanced to take color images. For getting the finest possible resolution it is desirable not to use colored CCDs, where the color filters are fitted to each of the pixels. This is because converting a colored picture to a black-and-white one with precision is difficult. In accordance with the present invention, several color filters are used to capture pictures in different wavelengths, and create a composite color picture through post-processing. For this purpose, the wheel of color and transparent filters shown in FIGS. 7 and 7(a) may be used. The filter wheel could have four sections, for example, with one of them open, one with a transparent glass piece, and the other two with different colored filters. The open section may be used for code reading, where the focus is precisely calibrated. The transparent glass plate is used for taking a black-and-white picture, and choosing the thickness of the glass plate precisely for this purpose. In comparison, the thickness of the color filters is not as critical thickness, because the pictures taken through these filters are used to colorize the more precise black-and-white picture. For a human observer the chromaticity information does not have to be as precise as the luminosity information.

Detecting Physical Parameters: Distance, Dimensions and Weight of Target Object

The above-mentioned patent application entitled "IMAGING ENGINE AND METHOD FOR CODE READERS" discloses aiming systems and methods for determining target distances using image data and the projected aiming pattern. FIG. 8 illustrates one such method using an imaging engine with an aiming pattern generator and an image sensor having essentially parallel, offset optical axes.

Once an image of the aiming pattern is captured, the code reader may be calibrated and the offset of an image of a center marker of the aiming pattern can then be used to estimate the distance between the optical code reader and the target. This procedure is illustrated with reference to FIG. 8. In the Figure, the principal axis 30 of the objective lens and the principal output axis of the aiming system 32 are parallel and offset by a small distance A", for example, 5 mm. A ray which tracks a beamlet defining the center marker of the aiming frame is collinear with the axis 32. The locations of the center marker in a first target plane 600 and a second target plane 602 are indicated at points X and Y, respectively. The images of points X and Y on the surface of an area image sensor 604 are x' and y', respectively. It will be observed that points $x^1$ and $y^1$ are offset slightly from one another. This offset can be correlated with the distances $D_1$ and $D_2$ of the target planes 600 and 602, respectively. Once the system is calibrated, information concerning the offset of the image of the central marker viewed at an arbitrary distance may be used to estimate the distance between the code reader and the target from which the center marker is reflected.

If there is feature of known size on the object, for example a UPS shipping barcode, then object size can be computed in accordance with the proportionate relationship of the length of the known feature in the image to the length of the unknown feature in the image. Alternatively, given the range of the as determined above and the size of the object in the image, triangulation can be used to compute the size of the physical object.

The determination of the physical size of the object may proceed employing the following techniques. These techniques are based on the assumption that the imaged 3D object is a rectangular solid object. A parallel projection of the 3D object is considered, rather than a true perspective projection. The parallel projection is believed to provide a sufficiently accurate solution for most practical implementations.

The following discussion presents the equations to obtain actual 3D dimensions from a 2D projection (image) of an object.

Figure 8A:
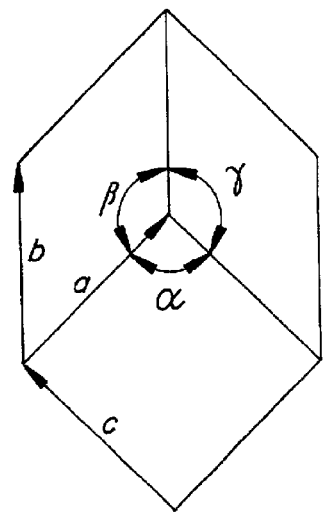
FIG. 8a is a diagram illustrating a method of determining the size of an object in a field of view of an imager.
Figure 8:
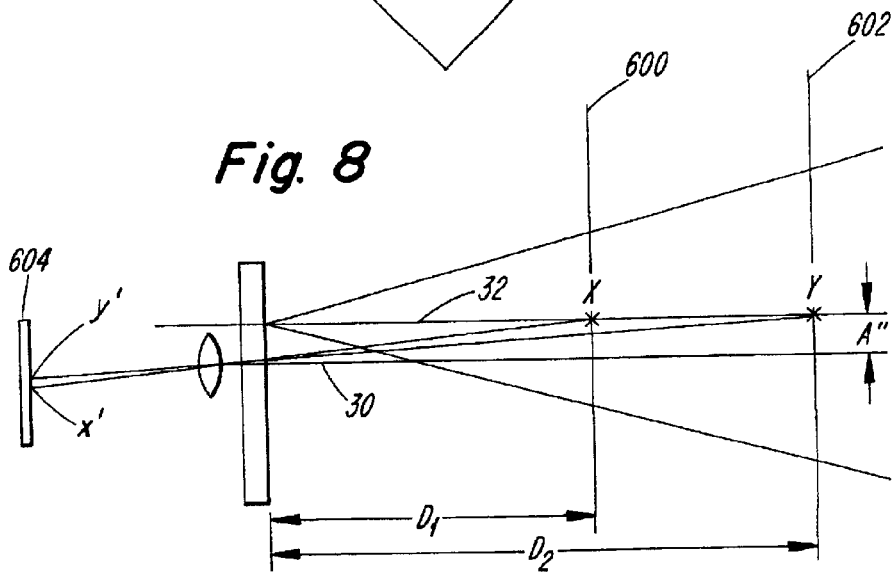
FIG. 8 is a sectional view illustrating the use of an aiming pattern to determine target distance.

FIG. 8a shows a 2D image of a 3D rectangular solid, for example a box having orthogonal edges. $\alpha$, $\beta$ and $\gamma$ are the projected angles between the images of visible edges of the rectangular solid which meet at a corner of the object nearest the imager. a, b, c are vectors along the major axes. Given the imaged length of the vectors along a, b, c, their original dimensions are obtained by using scale factors $S_a$, $S_b$, $S_c$ respectively. Equations for these scale factors are given below. A, B, $\omega$, $\nu$ are intermediate parameters used by these equations. Let:

$$A = \cos(\beta - 90°), \quad B = \cos(\gamma - 90°)$$

Then:

$$\tan^4\omega = (1/A^2 - 1)/(1/B^2 - 1)$$

$$\sin 2\nu = ((1/A^2 - 1)(1/B^2 - 1))^{1/2}$$

Solving for $\omega$ and $\nu$, the scale factors are given as:

$$S_a = A/\cos(\omega)$$

$$S_b = 1/\cos(\nu)$$

$$S_c = B/\sin(\omega).$$

If $L_a$, $L_b$ and $L_c$ are the actual lengths of edges corresponding to image vectors a, b and c, then the actual length may be approximated in accordance with the following expressions:

$$L_a = S_a * a * Q$$

$$L_b = S_b * b * Q$$

$$L_c = S_c * c * Q$$

where Q is the ratio of actual length to image length for an imaged object in a plane perpendicular to the optical axis of the imager at the target distance d. It will be understood that the value of Q is a function of determined target distance d and is a property of the particular optical imaging system employed.

Figure 9:
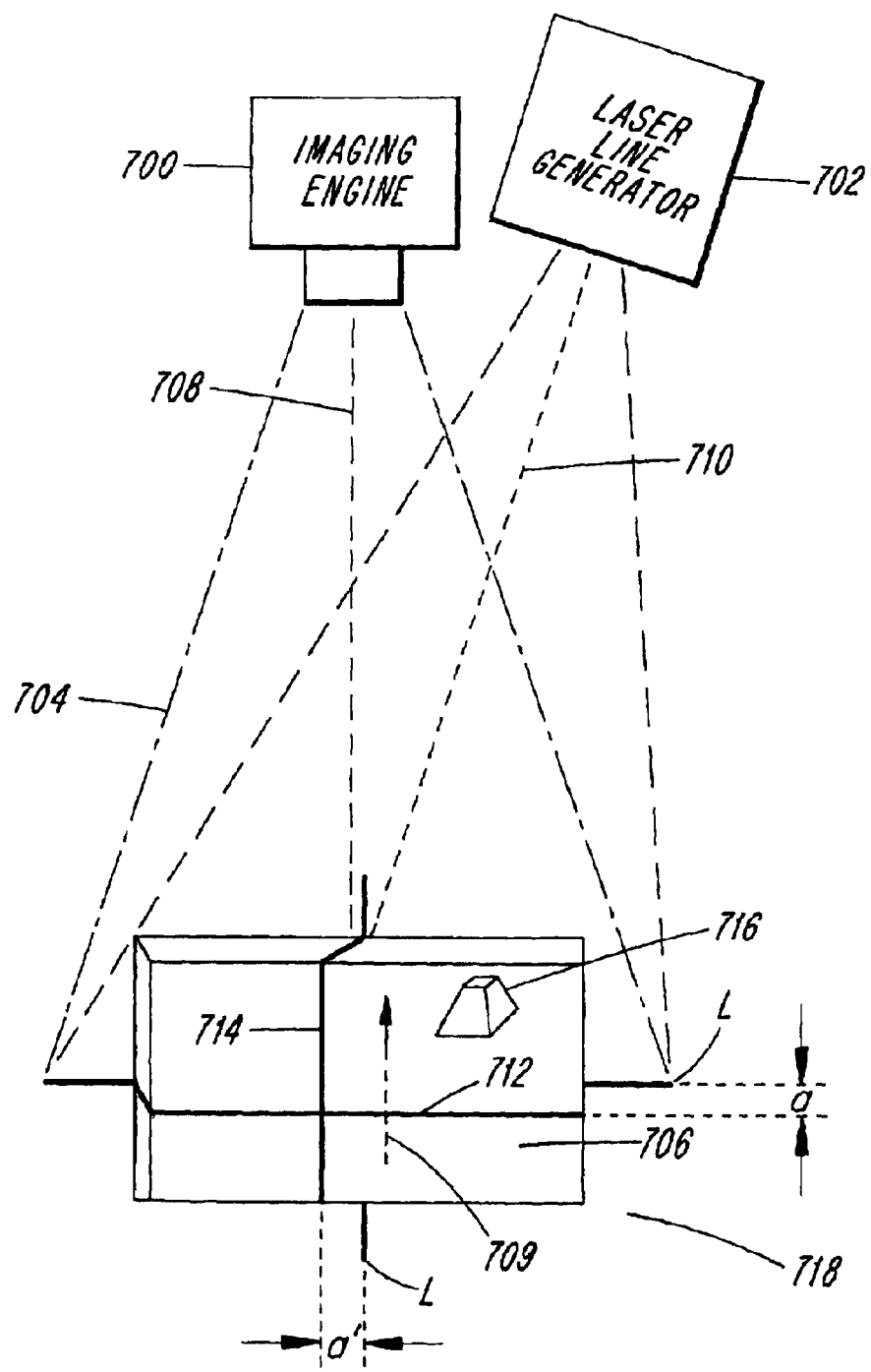
FIG. 9 shows an apparatus for projecting laser line patterns on a weighing platform in accordance with a preferred embodiment of the present invention.

FIG. 9 shows an apparatus for projecting and detecting laser line patterns on a weighing platform to determine, among other things, the weight of a target object. Such an apparatus is useful, for example, in supermarket checkout systems where produce is priced in accordance with weight determined at the checkout counter.

The apparatus of FIG. 9 includes an imaging engine or video camera 700 and a line generating device 702 for projecting one or more lines L on objects within the field of view 704 of the imaging engine. In preferred embodiments the line generating device can be a laser diode with a diffractive optical element in the path of the laser beam. A weighing platform 706 is mounted on mechanical supports that displace vertically with applied weight (e.g. springs). The line generating device may project a pattern of light in the field of view of the image sensor along an optical path which is not colinear with at least one of an optical axis 708 of the image sensor and an axis of movement 709 of the platform in response to the weight of the object. As shown in FIG. 9, the line generating device may be mounted at an angle with respect to the optical axis 708 of the imaging engine 700. An optical axis 710 of the line generator is also oriented off-axis from the axis of movement 709 of the platform 706 in response to the weight of a object placed on it.

In the embodiment of FIG. 9 the line generator produces a cross hair pattern, including perpendicular lines 712 and 714. However, it will be understood that a single laser line may be sufficient to perform the weighing operation. In FIG. 9, the platform 706 is shown displaced by weight 716. The displacement is downwardly with respect to a counter surface 718 which surrounds it. As a result, lines 712 and 714 are broken into segments separated by dimensions a and a', respectively. Such separations are referred to as "edge discontinuities" created by edges or adjacent, offset surfaces in the field of view of the image sensor. It will be understood that these dimensions may be proportional or otherwise related in value to the weight necessary to cause the corresponding downward displacement of the platform 706.

Figure 10:
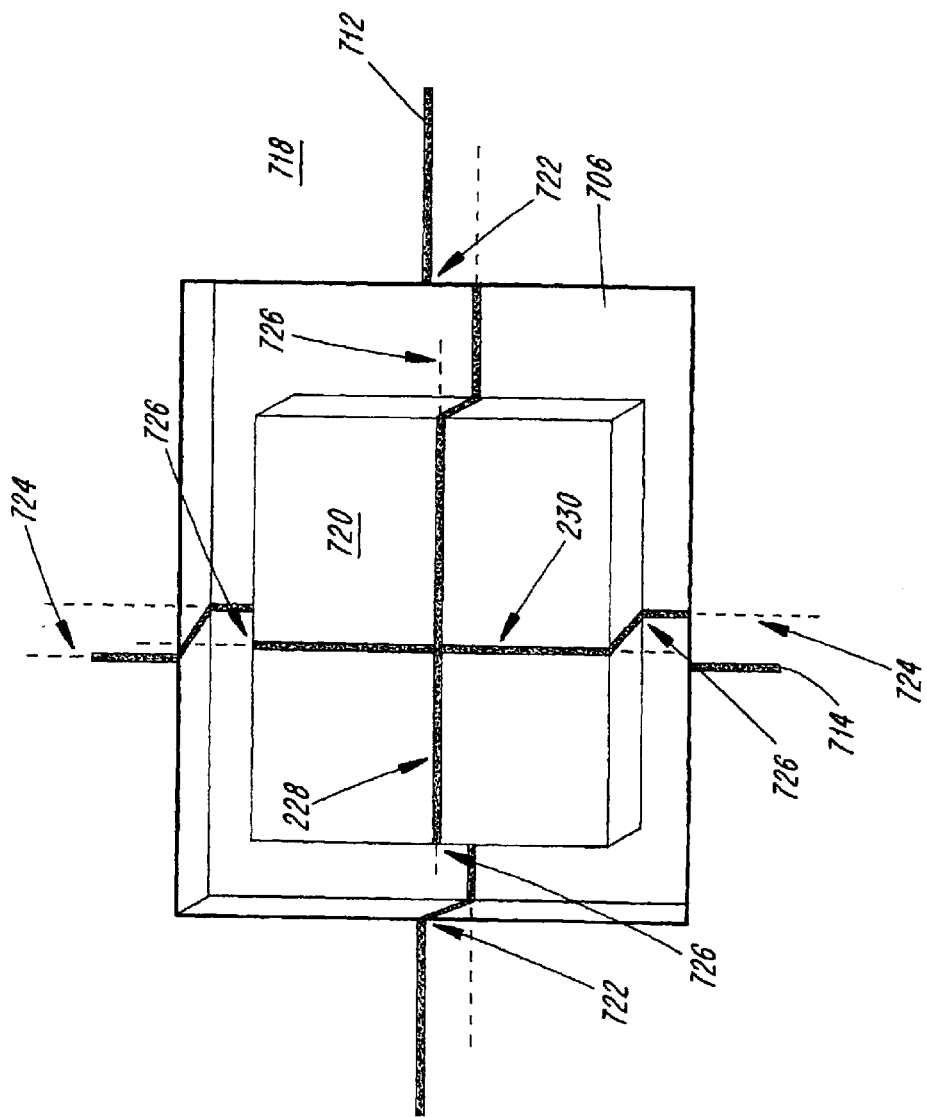
FIG. 10 illustrates the extraction of length, width, height and weight information from an image of a target object and platform.

FIG. 10 illustrates the use of the system of FIG. 9 to determine various physical parameters of a target object (package) 720, located on the platform 706. Displacements of segments of line 712 at 722 can be employed as indicators of weight of the target object 720. Similarly displacements of line 714 at 724 may be used as indicators of weight. The vertical height of the object at its edges may be determined from displacements 726. Finally, the length and width of the object can be determined from the imaged length of the line segments 228 and 230, respectively, taking into account, as necessary, the effects of the determined distance of the object from the image sensor and/or the vertical displacement of the upper surface of the object 720 with respect to the counter surface 718.

The apparatus of FIGS. 9 and 10 may be used in the following way. An operator may pick up a package 720 and place it on the platform 706. The platform will move in the vertically downward direction to a degree dependent on the weight of the package. This downward displacement will result in the shifts in the laser lines (discussed in connection with FIG. 10) as viewed by the imaging engine and from one or more of these displacements, the weight of the package can be calculated. The height of the package will also result in the shift of the laser lines indicated at 726 in FIG. 10 and from those shifts the height of the box can be determined. A simple classical edge detection image processing algorithm can be implemented to determine the width and the length of the box from the dimensions of the line segments 228 and 230.

FIGS. 11, 12(*a*) and 12(*b*) illustrate an alternative embodiment of the present invention which measures the dimensions and distance of a target object 800. The apparatus may include a target object supporting surface 802 and a stand 804 for supporting a imaging and projecting module 806. It will be understood that the surface 802 and module 806 may be oriented in various ways with respect to one another in order to accommodate convenient operator access and to facilitate location of target objects in the system.

Advantageously, the module 806 includes an imaging engine 808 of the type described in the above-mentioned application "IMAGING ENGINE AND METHOD FOR CODE READERS". The imaging engine includes a diffractive optic system for projecting an aiming pattern 810 in the field of view 812 of the image sensor 814 of the imaging engine. Image information from the reflected aiming pattern may be used to determine the distance of the image sensor from the surface reflecting the pattern in the manner described in the above-mentioned application. Another diffractive optic system 815 may be employed to project a cross-hair pattern 816 onto the target object 800 and onto reference surface 802. Image information from the reflected pattern may be used to determine dimensions of the object as discussed in detail above. Information obtained concerning the distance of the upper surface 818 may be used to scale dimensional information obtained from the cross hair pattern 816 in order to compensate for the fact that line segments and offsets closer to the image sensor will appear larger than ones located further away.

The system of FIG. 11 can include a self-calibration feature. A marker or flag 820 can be located on the surface 802 or at another preselected location within the field of view 812 of the image sensor. OCR software associated with the imager can be employed to recognize the marker or flag and calibrate the system based on the size or position of the detected image or information coded therein.

FIGS. 12(*a*) and 12(*b*) are details of the module 806 illustrating certain aspects of the apparatus. FIG. 12(*a*) is a top view of the module. As shown the module may be equipped with a display 822, which receives a live video signal from the imaging engine. The displayed image may, for example, be used by an operator to position a target object in the apparatus and to verify that the aiming pattern and cross hairs are properly projected on a target object of interest. The module may also be equipped with a keypad 824, which may be used to input data into the module or into a host computer.

FIG. 12(*b*) shows the underside of the module 806. The imaging engine 808 includes the image sensor 814 and the aiming pattern projector 826. Illumination sources 828 may also be included in the engine. The structure and function of the aiming pattern projector and illumination sources are described in detail in the above-referenced patent application. In a preferred embodiment, the principle optical axes of the image sensor 814 and the aiming pattern projector 826 are parallel and offset from one another. Both axes may be oriented at an oblique angle with respect to the principle axis of the diffractive optics system 815 which projects the cross hair pattern. This angular positioning may be used to produce the offsets in the detected imaging of the cross hair pattern as explained above.

While dimensioning aspects of the present invention has been described in connection with imaging code readers located on stands or in fixed positions, it will be understood that aspects of the present invention may be practiced with mobile or handheld code readers as well. As described above, the aiming pattern generation of the imaging engine may be used to determine the range of an imaged object. Lengths of segments of projected patterns reflected by the object may be measured, and scaled to convert them to object dimensions using the determined range. If the target object is marked with a label, barcode, MaxiCode, etc. of known size, that information can be used to check the range and dimension determinations. Moreover, conventional image analysis may be used to obtain target object dimensions once the target object distance has been determined in one of the above described ways. If the object is assumed to be a regular cylinder or regular rectangular solid (as are most products and packages), object dimensions can be ascertained by measuring the image distances between readily detected image edges, and scaling such dimensions in accordance with the determined range and angular relationship of the detected edges.

The described embodiments of the present invention are intended to be illustrative rather than restrictive, and are not intended to represent every embodiment of the present invention. Various modifications and variations can be made to the disclosed systems without departing from the spirit or scope of the invention as set forth in the following claims both literally and in equivalents recognized in law.

We claim:

1. An optical code decoding system comprising:
    an imagina apparatus for obtaining and displaylng video image signals comprising:
        a handhold optical code reader including a two dimensional image sensor having means for outouting image data and video data at at least three frames per second said handhold optical code reader further including means for compressing said video data output from the image sensor;
        a host terminal with a communication port and display;
        a narrow band width data link over which compressed video data from the handheld optical code reader are communicated to a communication port of the host terminal; and
        at least one processor for decoding an ontical code cantured by at least the video data.

2. The system of claim 1, wherein the imaging apparatus further comprises means for detecting acomniand bar code for switching the handheld optical code reader between an optical code reading mode and a video data communication mode.

3. The system of claim 1, wherein the handheld optical code reader includes a microprocessor and output driver for communication with the host terminal, and wherein the host terminal is a computer with a serial communication port for receiving the compressed video data and for receiving decoded information from optical codes read by the handheld code reader.

4. The system of claim 1, wherein the narrow band width data link is a cable connected between the handbeld optical code reader and a serial communication port of the host terminal.

5. The system of lcaim 1, wherein the narrow band width data link is a radio frequency transmitter and receiver.

6. The system of claim 1, wherein the narrow band width data link is an infrared transmitter and receiver.

7. The system of claim 1, wherein the imaging apparatus further comprising means for detecting motion in a field of view of the handheld optical code reader.

8. The system of claim 7, wherein motion is detected by monitoring the bandwidth of the compressed video signal.

9. The system of claim 1, wherein the handheld optical code reader further includes:
an objective lens located in an optical path or the code reader for focosiag an image of an optical code onto the image sensor;
a carrier rotatable about an axis and having a sector radially outwardly located from the rotation axis through which optical codes are read, the caniar having a second sector located radially outwardly of the axis, said second sector containing an optical element, which when placed in the optical path changes the focal distance of the objective lens to a focal distance more appropriate for producing video images with the handheld optical code reader; and
means for rotating the cariier for selectively positioning a selected one of first and said second sectors in the optical path.

10. The system of claim 9, wherein the first sector is open and the second sector contains a piano glass optical element which increases the focal distance of the optical system.

11. The system of claim 9, further comprising:
a third sector located radially outwardly of said axis and selectively positionable in the optical path of the system and containing a first monochrome filter; and
a fourth sector located radially outwardly of said axis and selcetively positionable in the optical path of the system, containing a second, different monochrome filter, wherein the monochrome filters are employed to obtain image data to produce a color video display.

12. The system of claim 11, further comprising:
a laser pattern projector for projecting pattern from the hazidheld optical code reader, and
a fifth sector located radially outwardly of said axis and selectively positionable in the optical path of the system, containing an optical band pass filler approximately centered on a wavelength of the projected pattern.

13. The system of claim 12, further comprising means for monitoring the rotation of the carrier in response to the detection of the fifth sector being rotated into the optical path.

14. The system of claim 9, whcreia the carrier is a wheel rotatable about a central axis thereof and divided into plural angular setcors, at least one of which sector being adapted for positioning in the optical path for imaging an optical code in a working depth of field of the optical code reader and at least two other sectors being adapted for focnsing images on the image sensor from which a color video signal is derived.

15. The system of claim 1, wherein the at least one processor further measures a physical parameter of an object from the image data and/or video data.

16. A method for reading an optical code disnosed on an object and obtainian at least onc ohvsicai nararneter of said object, comprising the steps of:

providing an optical code reader configured for acquiring image data and video data at at least three frames per second; and
performing motion detection using an the optical code reader comprising the steps of:
positioning an image sensor of the optical code reader so that a field of view of the image sensor includes a region to be monitored for motion;
switching the optical code reader from an optical code reading mode to video mode;
analysing video data in the field of view of the image sensor;
identifying changes between a set of frames of video data; and
monitoring thc frequency of the changes between the set of frames of video data to identify frequency changes indicative of the movement of objects of interest in the field of view.

17. The method of claim 16, further comprising the steps of:
compressing the video data from the image sensor;
transmitting the compressed video data from the optical code reader to a terminal; and
displaying tho image of the field or view of the image sensor at the terminal, and observing images at the terminal based on the detection of motion in the field of view.

18. The method of claim 16, further comprising the step of:
measuring orthogonal dimensions of a rectangular solid object in the field of view of the image sensor, comprising the steps of:
obtaining pixel information for the held of view of the image sensor;
determining a dislance between the object and the image sensor;
determining the angles between edges of the rectangular solid meeting at a nearest corner cif the object and dctcrmining an imaged length of edges of the rectangular solid to be measured from the pixel informiation; and
scaling the deerndned image length of the edges responsive to the determined angles and determined distance between the rectangular solid and the image sensor to obtain an approximation of the actual length of said edges.

19. The method of claim 18, wherein the distance between the object and the image sensor is determined from a detected image of an aiming pattern projected onto the object.

20. The method of claim 18, wherein the distance between the object and the image sensor is determined from at least one image dimension of an optical code symbol of known siae on the object.

21. The method of claim 18, wherein the image sensor is incornorated within an imaging optical code reader.

* * * * *

UNITED STATES PATENT AND TRADEMARK OFFICE
CERTIFICATE OF CORRECTION

PATENT NO.    : 6,766,955 B2
DATED         : July 27, 2004
INVENTOR(S)   : Patel et al.

It is certified that error appears in the above-identified patent and that said Letters Patent is hereby corrected as shown below:

Column 16,
Line 30, delete "imagina" insert -- imaging --
Line 30, delete "displaylng" insert -- displaying --
Lines 32 and 35, delete "handhold" insert -- handheld --
Lne 33, delete "outouting" insert -- outputing --
Line 43, delete "ontical" insert -- optical --
Line 44, delete "cantured" insert -- captured --
Line 46, delete "acomniand" insert -- a command --
Line 58, delete "handbeld" insert -- handheld --
Line 61, delete "oflcaim" insert -- of claim --

Column 17,
Line 6, delete "focosiag" insert -- focusing --
Line 10, delete "caniar" insert -- carrier --
Line 21, delete "piano" insert -- plano --
Line 45, delete "whcreia" insert -- wherein --
Line 50, delete "focnsing" insert -- focusing --
Line 56, delete "disnosed" inset -- disposed --
Line 57, delete "obtainian" insert -- obtaining --
Line 57, delete "onc ohvsical narnarneter" insert -- one physical parameter --

Column 18,
Line 24, delete "tho" insert -- the --
Line 24, delete "or" insert -- of --
Line 33, delete "held" insert -- field --
Line 35, delete "dislance" insert -- distance --
Line 38, delete "cif" insert -- of --
Line 39, delete "dctcermining" insert -- determining --
Line 41, delete "informiation" insert -- information --
Line 42, delete "deerndned" insert -- determined --

UNITED STATES PATENT AND TRADEMARK OFFICE
CERTIFICATE OF CORRECTION

PATENT NO. : 6,766,955 B2
DATED : July 27, 2004
INVENTOR(S) : Patel et al.

It is certified that error appears in the above-identified patent and that said Letters Patent is hereby corrected as shown below:

Column 18 (cont'd),
Line 54, delete "siae" insert -- size --
Line 56, delete "incoronated" insert -- incorporated --

Signed and Sealed this

First Day of February, 2005

JON W. DUDAS
*Director of the United States Patent and Trademark Office*